(12) United States Patent
Heo et al.

(10) Patent No.: US 7,369,527 B2
(45) Date of Patent: May 6, 2008

(54) APPARATUS AND METHOD FOR TRANSMITTING AND RECEIVING CONTROL INFORMATION IN A MOBILE COMMUNICATION SYSTEM

(75) Inventors: Jin-Woo Heo, Songnam-shi (KR); Sang-Min Bae, Suwon-shi (KR); Young-Kwon Cho, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 1241 days.

(21) Appl. No.: 10/307,643

(22) Filed: Dec. 2, 2002

(65) Prior Publication Data
US 2003/0103481 A1 Jun. 5, 2003

(30) Foreign Application Priority Data
Nov. 30, 2001 (KR) .................. 10-2001-0075309

(51) Int. Cl.
*H04B 7/216* (2006.01)
*H04B 7/00* (2006.01)
*H04Q 7/20* (2006.01)

(52) U.S. Cl. .................... 370/335; 455/522; 455/69

(58) Field of Classification Search ............. 370/335, 370/468, 465; 455/522, 69, 127.1
See application file for complete search history.

(56) References Cited

U.S. PATENT DOCUMENTS

| 6,542,736 B1* | 4/2003 | Parkvall et al. ......... 455/452.2 |
| 7,120,845 B2* | 10/2006 | Kwon et al. ............. 714/746 |
| 7,167,461 B2* | 1/2007 | Odenwalder et al. ...... 370/335 |

* cited by examiner

*Primary Examiner*—Tilahun Gesesse
(74) *Attorney, Agent, or Firm*—The Farrell Law Firm, PC (57) ABSTRACT

Disclosed is an apparatus and method for transmitting and receiving control information for a packet data channel in a mobile communication system supporting a high-speed packet data service and a circuit voice service. A base station generates control information indicating an encoder packet size, a code rate and the number of Walsh codes used for transmission of packet data to a mobile station, and transmits the generated control information over a packet data control channel. The mobile station receives the control information over the packet data control channel while receiving the packet data over the packet data channel, and decodes the received packet data according to a modulation order determined based on the received control information.

12 Claims, 7 Drawing Sheets

FIG. 1
(PRIOR ART)

| Number of Walsh Codes | Number of Slots per Subpacket | Modulation Order | Effective Code Rate | Number of Walsh Codes | Number of Slots per Subpacket | Modulation Order | Effective Code Rate |
|---|---|---|---|---|---|---|---|
| 4 | 8 | 4 | 0.625000 | 19 | 8 | 2 | 0.263158 |
| 5 | 8 | 3 | 0.666667 | 19 | 4 | 2 | 0.526316 |
| 6 | 8 | 3 | 0.555556 | 19 | 2 | 4 | 0.526316 |
| 7 | 8 | 3 | 0.476190 | 20 | 8 | 2 | 0.250000 |
| 7 | 4 | 4 | 0.714286 | 20 | 4 | 2 | 0.500000 |
| 8 | 8 | 2 | 0.625000 | 20 | 2 | 3 | 0.666667 |
| 8 | 4 | 4 | 0.625000 | 21 | 8 | 2 | 0.238095 |
| 9 | 8 | 2 | 0.555556 | 21 | 4 | 2 | 0.476190 |
| 9 | 4 | 4 | 0.555556 | 21 | 2 | 3 | 0.634921 |
| 10 | 8 | 2 | 0.500000 | 22 | 8 | 2 | 0.227273 |
| 10 | 4 | 3 | 0.666667 | 22 | 4 | 2 | 0.454545 |
| 11 | 8 | 2 | 0.454545 | 22 | 2 | 3 | 0.606061 |
| 11 | 4 | 3 | 0.606061 | 23 | 8 | 2 | 0.217391 |
| 12 | 8 | 2 | 0.416667 | 23 | 4 | 2 | 0.434783 |
| 12 | 4 | 3 | 0.555556 | 23 | 2 | 3 | 0.579710 |
| 13 | 8 | 2 | 0.384615 | 24 | 8 | 2 | 0.208333 |
| 13 | 4 | 3 | 0.512821 | 24 | 4 | 2 | 0.416667 |
| 13 | 2 | 4 | 0.769231 | 24 | 2 | 3 | 0.555556 |
| 14 | 8 | 2 | 0.357143 | 25 | 8 | 2 | 0.200000 |
| 14 | 4 | 3 | 0.476190 | 25 | 4 | 2 | 0.400000 |
| 14 | 2 | 4 | 0.714286 | 25 | 2 | 3 | 0.533333 |
| 15 | 8 | 2 | 0.333333 | 25 | 1 | 4 | 0.800000 |
| 15 | 4 | 2 | 0.666667 | 26 | 8 | 2 | 0.192308 |
| 15 | 2 | 4 | 0.666667 | 26 | 4 | 2 | 0.384615 |
| 16 | 8 | 2 | 0.312500 | 26 | 2 | 3 | 0.512821 |
| 16 | 4 | 2 | 0.625000 | 26 | 1 | 4 | 0.769231 |
| 16 | 2 | 4 | 0.625000 | 27 | 8 | 2 | 0.185185 |
| 17 | 8 | 2 | 0.294118 | 27 | 4 | 2 | 0.370370 |
| 17 | 4 | 2 | 0.588235 | 27 | 2 | 3 | 0.493827 |
| 17 | 2 | 4 | 0.588235 | 27 | 1 | 4 | 0.740741 |
| 18 | 8 | 2 | 0.277778 | 28 | 8 | 2 | 0.178571 |
| 18 | 4 | 2 | 0.555556 | 28 | 4 | 2 | 0.357143 |
| 18 | 2 | 4 | 0.555556 | 28 | 2 | 3 | 0.476190 |
| | | | | 28 | 1 | 4 | 0.714286 |

| Encoder Packet size (Bits) | # of coded symbol with R=1/5 | QPSK | | | | B-PSK | | | | 16-QAM | | | |
|---|---|---|---|---|---|---|---|---|---|---|---|---|---|
| | | 1-TS | 2-TS | 4-TS | 8-TS | 1-TS | 2-TS | 4-TS | 8-TS | 1-TS | 2-TS | 4-TS | 8-TS |
| 384 | 1920 | 96xNw | 192xNw | 384xNw | 768xNw | 144xNw | 288xNw | 576xNw | 1152xNw | 192xNw | 384xNw | 768xNw | 1536xNw |
| 576 | 2880 | 96xNw | 192xNw | 384xNw | 768xNw | 144xNw | 288xNw | 576xNw | 1152xNw | 192xNw | 384xNw | 768xNw | 1536xNw |
| 768 | 3840 | 96xNw | 192xNw | 384xNw | 768xNw | 144xNw | 288xNw | 576xNw | 1152xNw | 192xNw | 384xNw | 768xNw | 1536xNw |
| 1152 | 5760 | 96xNw | 192xNw | 384xNw | 768xNw | 144xNw | 288xNw | 576xNw | 1152xNw | 192xNw | 384xNw | 768xNw | 1536xNw |
| 1536 | 7680 | 96xNw | 192xNw | 384xNw | 768xNw | 144xNw | 288xNw | 576xNw | 1152xNw | 192xNw | 384xNw | 768xNw | 1536xNw |
| 2304 | 11520 | 96xNw | 192xNw | 384xNw | 768xNw | 144xNw | 288xNw | 576xNw | 1152xNw | 192xNw | 384xNw | 768xNw | 1536xNw |
| 3072 | 15360 | 96xNw | 192xNw | 384xNw | 768xNw | 144xNw | 288xNw | 576xNw | 1152xNw | 192xNw | 384xNw | 768xNw | 1536xNw |
| 3840 | 19200 | 96xNw | 192xNw | 384xNw | 768xNw | 144xNw | 288xNw | 576xNw | 1152xNw | 192xNw | 384xNw | 768xNw | 1536xNw |

APPARATUS AND METHOD FOR TRANSMITTING AND RECEIVING CONTROL INFORMATION IN A MOBILE COMMUNICATION SYSTEM

PRIORITY

This application claims priority to an application entitled "Apparatus and Method for Transmitting and Receiving Control Information in a Mobile Communication System" filed in the Korean Industrial Property Office on Nov. 30, 2001 and assigned Ser. No. 2001-75309, the contents of which are hereby incorporated by reference.

BACKGROUND OF THE INVENTION

1. Field of the Invention

The present invention relates generally to a mobile communication system supporting a packet data service, and in particular, to an apparatus and method for transmitting and receiving control information related to a packet data channel (PDCH) for carrying packet data.

2. Description of the Related Art

A typical mobile communication system provides only a voice service to a mobile station (MS). However, with the development of the communication technology and at the request of users, researches have been carried out on a mobile communication system for supporting not only the voice service but also a data service for image communication and various Internet-related capabilities. A base station (BS) supporting both the voice and data services commonly classifies channels into circuit-based radio channels for the voice service and packet-based radio channels for the data service, and assigns the remaining radio resources except the radio resources used for the packet channels to packet channels. Here, the "radio resources" refer to transmission power, the number of Walsh codes, and a transmission period.

A CDMA2000 (Code Division Multiple Access 2000) 1xEV-DV (Evolution in Data and Voice) system, proposed to support both the voice service and high-speed packet data service, employs time division multiplexing (TDM) in order to transmit packet data to a plurality of users over a limited number of packet channels. A base station supporting the time division multiplexing assigns the entire power and Walsh codes available for packet data transmission to one mobile station for a particular time period. The base station selects mobile stations, to which it will assign radio resources every time period, by scheduling.

All mobile stations desiring to receive a data service from the base station must periodically report quality information of the radio channels to the base station. The base station then selects an optimal mobile station every time period, taking into account the radio channel quality information received from the mobile stations and an amount of accumulated data to be transmitted to the mobile stations so that the selected mobile station can maximize its data throughput while maintaining a data rate.

In the 1xEV-DV system, the number of Walsh codes available for packet data service is a maximum of 28, and the minimum time unit for transmitting packet data is 1.25 ms, which is called a "time slot (TS)." Actually, a time period for transmitting unit packet data becomes one of 1 TS, 2 TSs, 4 TSs, and 8 TSs, and data with a predetermined size is transmitted for this time period. The data with a predetermined size is called "encoder packet," since it is encoded at once by an encoder in a base station transmitter.

A size of the encoder packet that can be transmitted for a time period is defined as 384, 768, 1,536, 2,340, 3,072 and 3,840 bits. The encoder packet undergoes encoding, interleaving and modulation by a base station transmitter, and then spread by at least one Walsh code before being transmitted over a packet data channel (PDCH). Here, a data rate is determined according to the encoder packet size and transmission time period.

A code rate and a modulation order (or modulation technique) used by a base station to transmit packet data are determined according to the encoder packet size and the number of Walsh codes, in order to obtain optimal data throughput. Information on the encoder packet size and the number of Walsh codes (hereinafter, referred to as "control information") is transmitted to a mobile station over a separate packet data control channel different from the packet data channel. The mobile station then determines a modulation order and a code rate used for transmission of the packet data channel based on the control information, and receives packet data over the packet data channel.

Table 1 illustrates a frame format of control information transmitted over a packet data control channel (PDCCH).

TABLE 1

| Field | Length in Bits |
| --- | --- |
| MAC ID | 8 |
| ARQ Channel ID | 2 |
| Encoder Packet Size | 3 |
| Subpacket ID | 2 |
| Total | 15 |

Describing information fields shown in Table 1, a MAC ID (Medium Access Control Identifier) field, indicating a unique identifier assigned to a mobile station desiring to receive a packet data service, is used to identify a mobile station that intends to transmit control information. An ARQ (Automatic Repeat Request) Channel ID field is used to identify a maximum of 4 data packets that can be simultaneously transmitted to one mobile station. An Encoder Packet Size field, indicating a size of transmission packet data, is assigned 3 bits to identify the 6 predefined sizes of 384, 768, 1,536, 2,340, 3,072, and 3,840 bits. A Subpacket ID field is used to identify a format of coded symbols to be used during initial transmission and retransmission.

The number of Walsh codes is represented using all fields except the MAC ID fields at predetermined periods or each time the number of Walsh codes is changed, and the MAC ID is set to '000000'. If MAC ID is set to '000000', all mobile stations acquire information on the number of Walsh codes. In addition, a transmission time period (or the number of time slots) of packet data is equal to the transmission time period of a control information transmitted on a packet data control channel.

Figure 1:
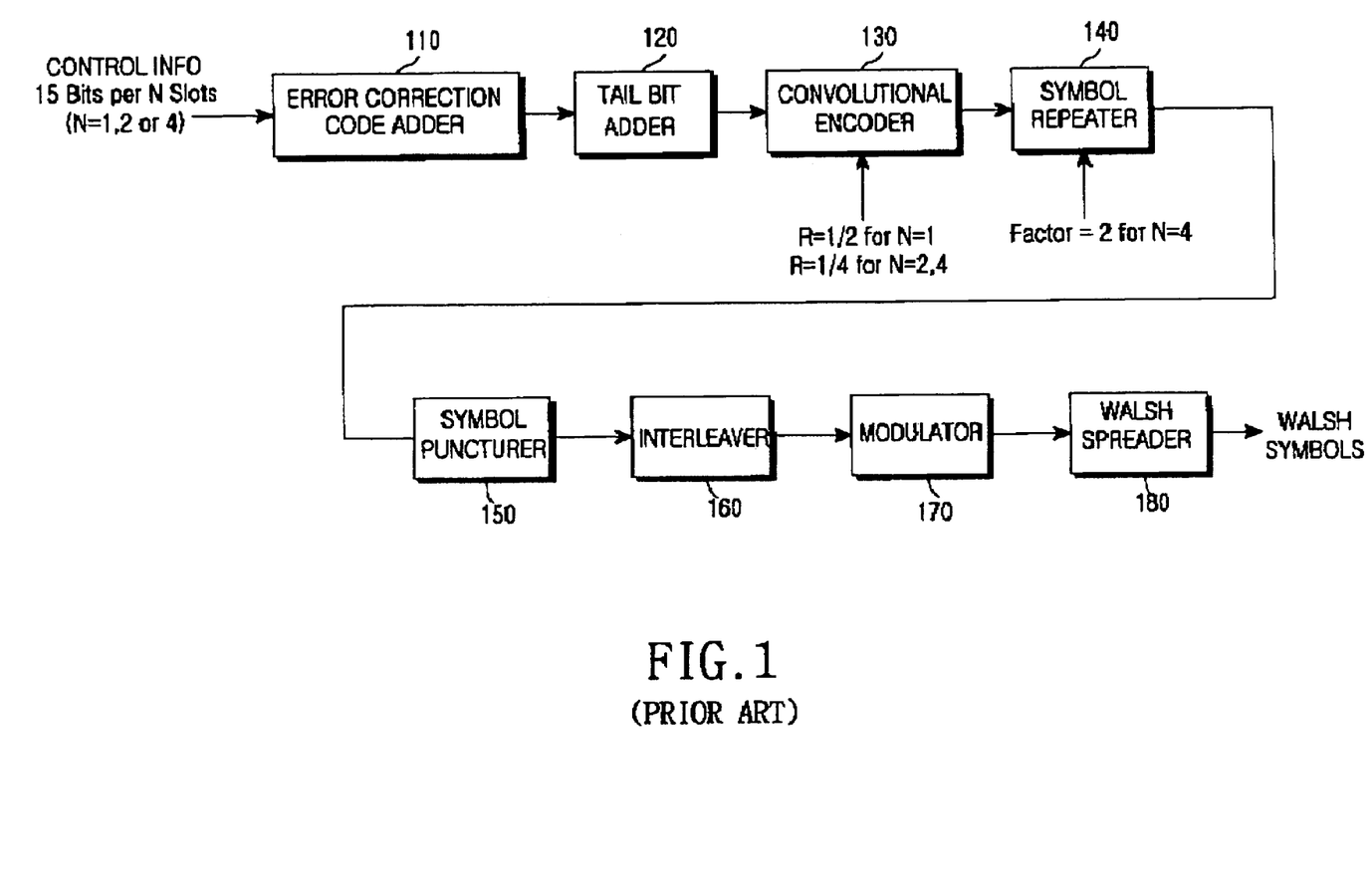
FIG. 1 illustrates a structure of a transmitter for transmitting control information over a packet data control channel according to the prior art.

FIG. 1 illustrates a structure of a base station transmitter for transmitting control information over a packet data control channel (PDCCH) according to the prior art. Referring to FIG. 1, an 8-bit error correction code is added by an error correction code adder 110 to the 15-bit control information (MAC ID, ARQ Channel ID, Encoder Packet Size and Subpacket ID) illustrated in Table 1, and then 8 tail bits are added to the error correction code-added control information by a tail bit adder 120, for convergence into a specified state during decoding. A convolutional encoder 130 encodes 29 output bits from the tail bit adder 120 at a code rate R determined based on the control information, and outputs coded symbols. For example, if the control information is transmitted over 1 TS (N=1), the code rate becomes R=½. If the control information is transmitted over 2 TSs (N=2) or 4 TSs (N=4), the code rate becomes R=¼.

The coded symbols output from the convolutional encoder 130 are properly repeated by a symbol repeater 140 according to the transmission time period of the control information. That is, if the control information is transmitted over 1 TS or 2 TSs (N=1 or 2), the input coded symbols are not repeated, and if the control information is transmitted over 4 TSs (N=4), the input coded symbols are repeated once. A symbol puncturer 150 punctures some of the repeated coded symbols according to a predetermined puncturing pattern, and outputs the remaining non-punctured symbols.

An interleaver 160 sets a size of its interleaving memory according to the number of symbols received from the symbol puncturer 150, and interleaves the received symbols using the interleaving memory. A modulator 170 modulates the interleaved symbols according to a predetermined modulation order (e.g., QPSK (Quadrature Phase Shift Keying)) and outputs modulation (or modulated) symbols. A Walsh spreader 180 spreads the modulation symbols output from the modulator 170 with a 64-chip length Walsh code assigned to the packet data control channel. The Walsh code assigned to the packet data control channel is distinguishable from Walsh codes assigned to packet data channels. Although it is not shown, the output of the Walsh spreader 180, together with an output of a packet data channel transmitter, are converted into an RF (Radio Frequency) band signal through spreading by a PN (Pseudo-random Noise) code and baseband filtering, and then transmitted through an antenna.

A mobile station can acquire information on an encoder packet size, a transmission time period and the number of Walsh codes related to a packet data channel, from control information received over a packet data control channel, determine a code rate and a modulation order used by a base station for transmission of the packet data channel, based on the acquired information and can decode a received data on packet data channel.

Figure 2:
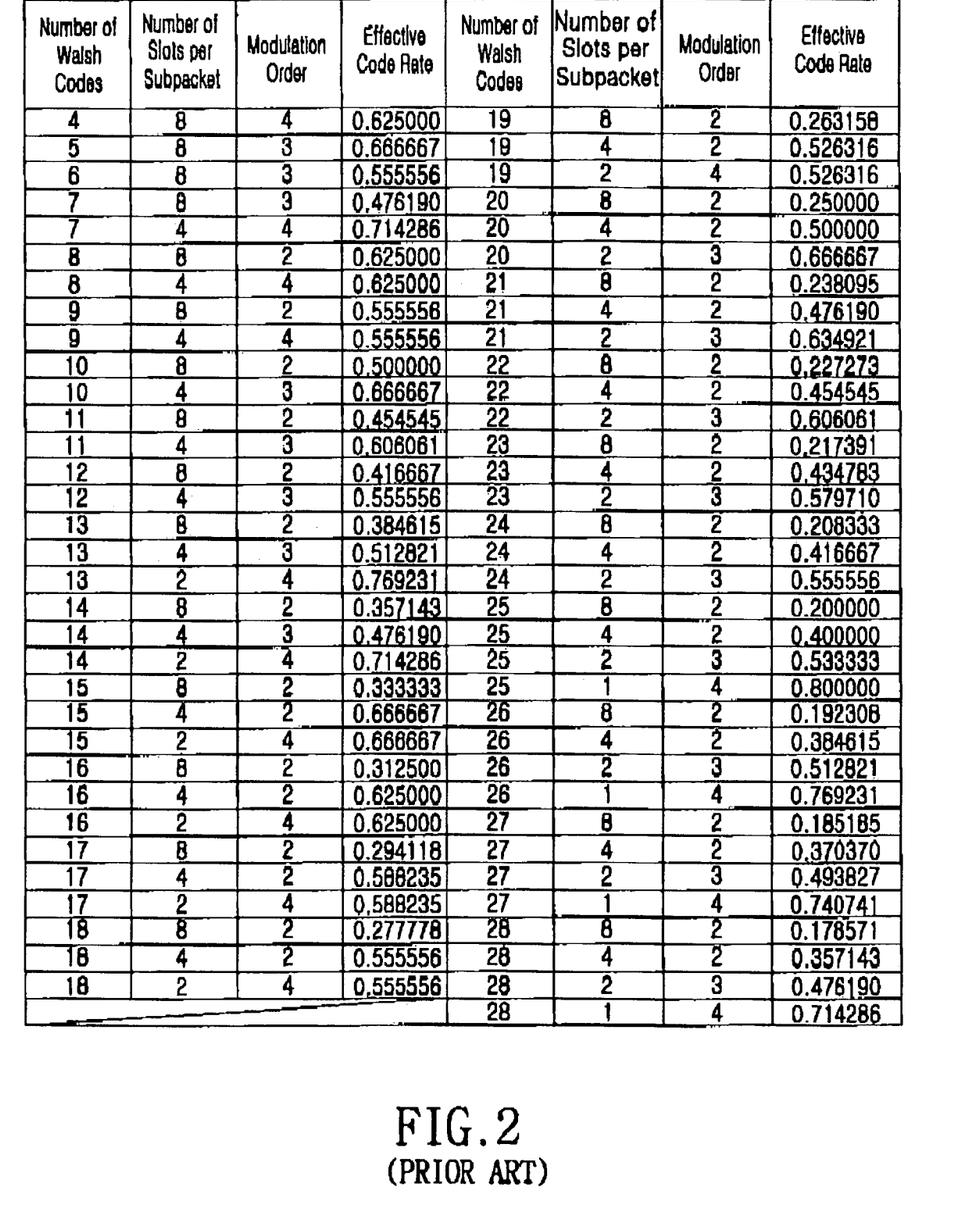
FIG. 2 illustrates an example of a mapping table for a 3,840-bit encoder packet size.

In such a mobile communication system, a base station uses a mapping table representing a mapping relationship between a code rate and a modulation order based on the number of Walsh codes and the number of transmission time slots for an encoder packet size, in order to provide information on a code rate and a modulation order to a mobile station. FIG. 2 illustrates an portion of a mapping table for a 3,840-bit encoder packet size. In a Modulation Order column of the mapping table, "2" represents QPSK (Quadrature Phase Shift Keying), "3" represents 8-PSK (8-ary Phase Shirt Keying), and "4" represents 16-QAM (16-ary Quadrature Amplitude Modulator).

Referring to FIG. 2, when a base station transmits a 3,840-bit size encoder packet (or coded packet) according to a modulation order of 16-QAM and an effective code rate of 0.625 and the base station uses 4 Walsh codes during an 8-TS transmission time period. In this case, the base station transmits control information representing the 3,840-bit encoder packet, the 4 Walsh codes and the 8-TS transmission time period over a packet data control channel, by consulting the previously stored mapping table of FIG. 2. A mobile station then receives the control information over the packet data control channel, and determines that the modulation order of 16-QAM and the effective code rate of 0.625 were used for the packet data channel, by consulting the mapping table of FIG. 2 corresponding to the 3,840-bit size among mapping tables previously stored therein.

As described above, in the prior art, the base station and the mobile station require a plurality of mapping tables according to the encoder packet sizes. That is, the base station and the mobile station must previously store mapping tables of FIG. 2 for the individual encoder packet sizes, before they start data communication. In order to store the mapping tables, larger memory capacity is required. As a result, the base station and the mobile station must increase their required memory capacity. The increase in memory capacity may be an insignificant matter in the base station, which has no limitation on the memory capacity. However, in the case of the mobile station, the increase in the required memory capacity is disadvantageous when minimization and reduction in power consumption and cost of the mobile station is desired.

In addition, when a mobile station sends a retransmission request for received packet data due to an error that occurred in the received packet data, a base station may select for retransmission a modulation order and a code rate different from those used at initial transmission in order to increase reception efficiency of the mobile station. However, since the mapping table defines possible modulation order and code rate according to the number of Walsh codes and a transmission time period, the base station has a limitation in adaptively selecting a modulation order and a code rate according to a radio channel condition. Thus, to support more various combinations of the modulation orders and code rates, it is necessary to increase a size of the mapping table. However, the increase in size of the mapping table causes an increase in necessary memory capacity of the base station and the mobile station.

SUMMARY OF THE INVENTION

It is, therefore, an object of the present invention to provide an apparatus and method for transmitting information on a modulation order used by a base station for transmission of packet data.

It is another object of the present invention to provide an apparatus and method for receiving, by a mobile station, information on a modulation order used by a base station for transmission of packet data.

It is further another object of the present invention to provide an apparatus and method for determining by a mobile station a modulation order used by a base station for transmission of packet data, without using a separate mapping table.

To achieve the above and other objects, the present invention provides a method for transmitting control information for a packet data channel in a transmitter for a mobile communication system, which encodes an encoder packet at a predetermined code rate, modulates the coded packet according to a predetermined modulation order, spreads the modulated packet with at least one Walsh code and transmits the spread packet over the packet data channel. The method in one embodiment comprises generating control information indicating parameters used for transmission of the spread packet over the packet data channel; and inserting at least one bit indicating a modulation order used for transmission the spread packet among a plurality of available modulation orders into one information field in the control information, and transmitting the control information.

To achieve the above and other objects, the present invention provides a method for receiving control information for a packet data channel by a receiver in a mobile communication system which encodes an encoder packet at a predetermined code rate, modulates the coded packet according to a predetermined modulation order, spreads the modulated packet with at least one Walsh code and transmits the spread packet to the receiver over the packet data channel. The method comprises receiving control information indicating parameters used for transmission of the spread packet over the packet data channel, over a packet data control channel physically distinguishable from the packet data channel; and extracting, from an information field in the received control information, at least one bit indicating a modulation order used for transmission of the spread packet among a plurality of available modulation orders.

To achieve the above and other objects, the present invention provides an apparatus for transmitting control information for a packet data channel in a transmitter for a mobile communication system, which encodes an encoder packet at a predetermined code rate, modulates the coded packet according to a predetermined modulation order, spreads the modulated packet with at least one Walsh code and transmits the spread packet over the packet data channel. The apparatus in one embodiment comprises a control information generator for generating control information indicating parameters used for transmission of the spread packet over the packet data channel, and inserting at least one bit indicating a modulation order used for transmission of the spread packet among a plurality of available modulation orders into one information field in the control information; and a control information transmitter for transmitting the control information over a packet data control channel physically distinguishable from the packet data channel.

To achieve the above and other objects, the present invention provides an apparatus for receiving control information for a packet data channel by a receiver in a mobile communication system which encodes an encoder packet at a predetermined code rate, modulates the coded packet according to a predetermined modulation order, spreads the modulated packet with at least one Walsh code and transmits the spread packet to the receiver over the packet data channel. The apparatus in one embodiment comprises a control information receiver for receiving control information indicating parameters used for transmission of the spread packet, over a packet data control channel physically distinguishable from the packet data channel; and an extractor for extracting, from an information field in the received control information, at least one bit indicating a modulation order used for transmission of the spread packet data among a plurality of available modulation orders.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the present invention provides a method for determining by a base station an encoder packet size, the number of Walsh codes and a modulation order over a packet data channel, and transmitting the determined control information over a packet data control channel formed separately from the packet data channel during a transmission time period. The transmission time period is equal to a transmission period of packet data.

Herein, a detailed description of the present invention will be made with reference to a CDMA2000 1xEV-DV (Evolution in Data and Voice) system, a synchronous CDMA communication system. However, it will be understood by those skilled in the art that the novel technique for transmitting control information for a packet data channel can be applied to other mobile communication systems having the similar technical background and channel formats without departing from the spirit and scope of the invention.

In addition, although the present invention will be described with reference to a case where time division multiplexing (TDM) is used for a packet data channel, the invention can be applied in the same manner to a TDM/CDM (Time Division Multiplexing/Code Division Multiplexing) system in which mobile stations share assigned time periods with Walsh codes, and a TDM/TDM (Time Division Multiplexing/Time Division Multiplexing) system in which mobile stations divide assigned time periods more finely.

First, a description will be made of packet data transmission by a base station. The base station determines a modulation order and a code rate according to transmission parameters to be used for transmission of packet data, i.e., an encoder packet size, the number of Walsh codes and the number of time slots, segments a packet data stream for a mobile station in a unit of the encoder packet size, encodes the segmented packet data at the code rate, modulates the coded packet data according to the modulation order, spreads the modulated packet data with Walsh codes, and then transmits the spread packet data over a packet data channel.

Here, the base station inserts information about the modulation order into control information including information about the encoder packet size at least, and transmits the control information over a packet data control channel. Table 2 illustrates a frame format of control information transmitted over a packet data control channel according to an embodiment of the present invention.

TABLE 2

| Field | Length in Bits |
|---|---|
| MAC ID | 8 |
| ARQ Channel ID | 2 |
| Encoder Packet Size | 3 |
| Subpacket ID | 2 |
| Modulation Order | 2 |
| Total | 17 |

It is noted that compared with Table 1, Table 2 further includes a Modulation Order field indicating a modulator order. Since modulation orders defined by the CDMA2000 1xEV-DV include QPSK (Quadrature Phase Shift Keying), 8-PSK (8-ary Phase Shift Keying) and 16-QAM (16-ary Quadrature Amplitude Modulation), the Modulation Order field is assigned 2 bits in order to identify these 3 types of the modulation orders. Even though 64-QAM (64-ary Quadrature Amplitude Modulation) is additionally used, the 2 bits assigned to the Modulation Order field are sufficient to identify the modulation orders. However, if only two types of modulation orders are used, the Modulation Order field may be assigned 1 bit.

Figure 3:
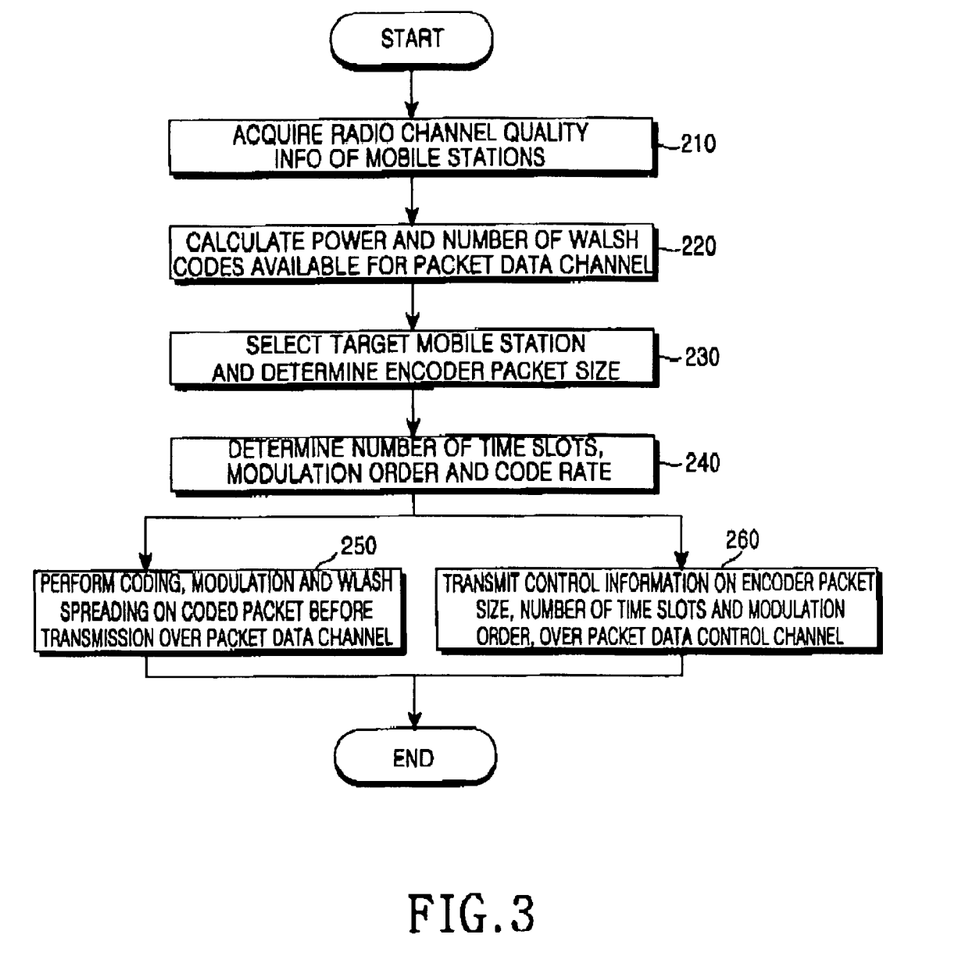
FIG. 3 is a flowchart illustrating a procedure for transmitting packet data and control information by a base station transmitter according to an embodiment of the present invention.

The number x of Walsh codes assigned to a packet data channel is represented using all fields except the MAC ID fields at predetermined periods or each time the period value is changed, and the MAC ID is set to '000000'. If MAC ID is set to '000000', all mobile stations acquire information on the number of Walsh codes through a packet data control channel. In addition, a transmission time period (or the number of time slots) of packet data is previously agreed between a base station and a mobile station so that the number of Walsh codes assigned it can be determined based on a transmission time period and an initial coding state of control information FIG. 3 is a flowchart illustrating a procedure for transmitting packet data and control information by a forward transmitter in a base station according to an embodiment of the present invention. Referring to FIG. 3, in step 210, the base station acquires forward radio channel quality information, specifically a measured carrier-to-interference ratio (C/I) of a forward pilot channel from each mobile station in data service. In step 220, the base station calculates the number of Walsh codes and transmission power, to be assigned for a packet data service. Though not separately illustrated, control information on the calculated number of Walsh codes is transmitted to every mobile station over a packet data control channel by periods or each time the number of Walsh codes is changed.

In step 230, based on the acquired radio channel quality information and an amount of data to be transmitted to the mobile stations, a packet transmission scheduler of the base station selects a mobile station to which it will assign a packet data channel, and determines an encoder packet size. Preferably, the scheduler first selects a mobile station having a better radio channel quality or greater amount of transmission data in order to increase data throughput of the system.

In step 240, based on forward radio channel quality information of the selected mobile station and the transmission power allocated for the packet data service, the base station determines the number of time slots, a modulation order and a code rate to be used for transmission of packet data to the selected mobile station, and generates control information indicating the determined values. Here, the base station determines a code rate and a modulation order in various ways, regardless of the encoder packet size, the transmission time period and the number of Walsh codes. Preferably, the code rate and the modulator order are determined according to radio channel environments and data throughput of the system.

In step 250, a packet data channel transmitter of the base station encodes an encoder packet with a predetermined size at the determined code rate, modulates the coded encoder packet by a known modulation technique having the determined modulation order, and spreads the modulated packet using the determined number of Walsh codes, before transmission. Further, in step 260, a packet data control channel transmitter of the base station transmits the control information about the encoder packet size, the number of time slots and the modulation order, through encoding, modulation and spreading. As described above, the control information about the number of Walsh codes is broadcast to all mobile stations regardless of presence of the transmission data.

Figure 4:
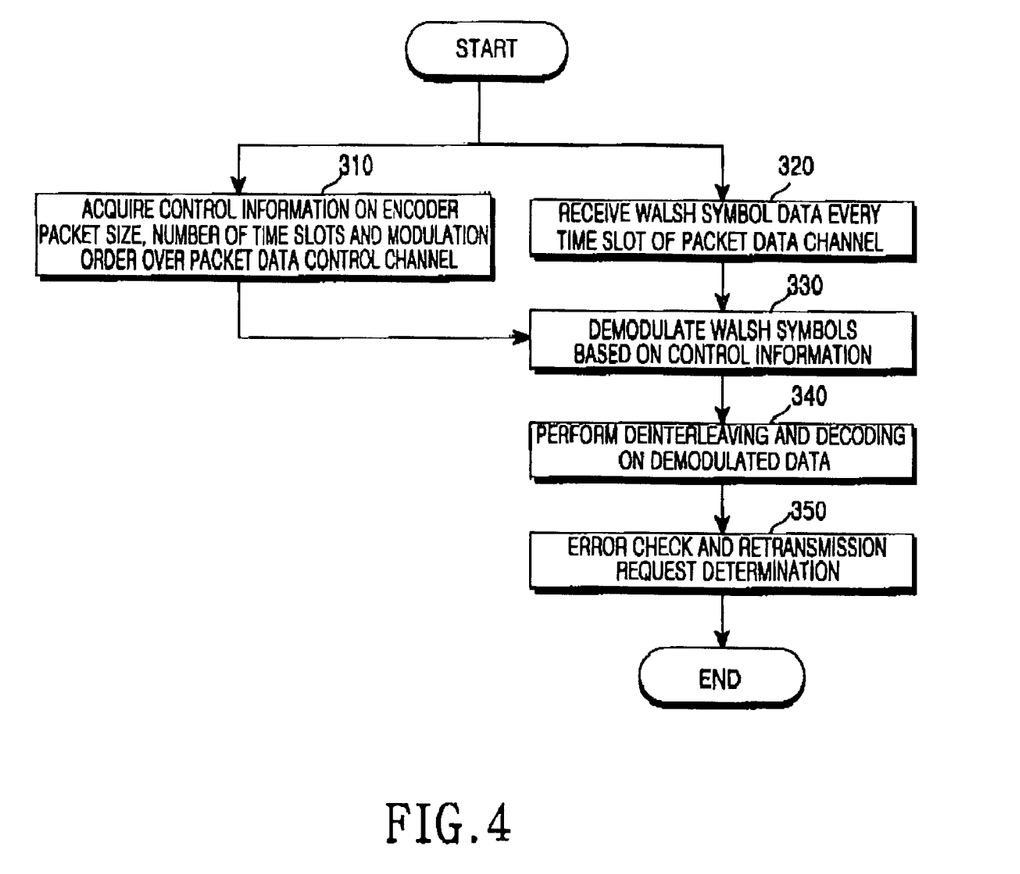
FIG. 4 is a flowchart illustrating a procedure for receiving packet data and control information by a mobile station receiver according to an embodiment of the present invention.

FIG. 4 is a flowchart illustrating a procedure for receiving packet data and control information by a forward receiver in a mobile station according to an embodiment of the present invention. Referring to FIG. 4, in step 310, a packet data control channel receiver of the mobile station acquires information about the encoder packet size, the number of time slots and the modulation order related to a packet data channel, through a packet data control channel. Here, the packet data control channel receiver can determine the encoder packet size and the modulator order from control information acquired by decoding data received over the packet data control channel, and can determine the number of time slots in the process of decoding the packet data control channel. It will be assumed herein that the mobile station previously acquires control information on the number of Walsh codes assigned to the packet data channel. The control information further includes MAC ID indicating a mobile station that desires to transmit packet data to the base station. The mobile station enables in step 320 its packet data channel receiver only when MAC ID included in the control information is identical to its own MAC ID.

In step 320, the packet data channel receiver receives packet data in the form of a Walsh symbol by despreading data received over a packet data channel every time slot with as many Walsh codes as the number of the assigned Walsh codes. In step 330, based on the control information, the packet data channel receiver demodulates Walsh symbols received for as many time periods as the number of time slots by a demodulation technique corresponding to the modulation technique used by the base station. In step 340, the packet data channel receiver deinterleaves and decodes the demodulated symbols. In step 350, the packet data channel receiver checks the decoded packet data to determine whether the packet data was correctly received. If the received data has an error, the packet data channel receiver transmits a retransmission request for the received packet data to the base station.

When a mobile station fails to correctly receive packet data initially transmitted by a base station, the mobile station stores the initially received data instead of discarding it, and then combines the initially received data with re-received data during decoding. In this case, for retransmission, the base station can successfully transmit packet data without using as many resources as those used at initial transmission.

Figure 5:
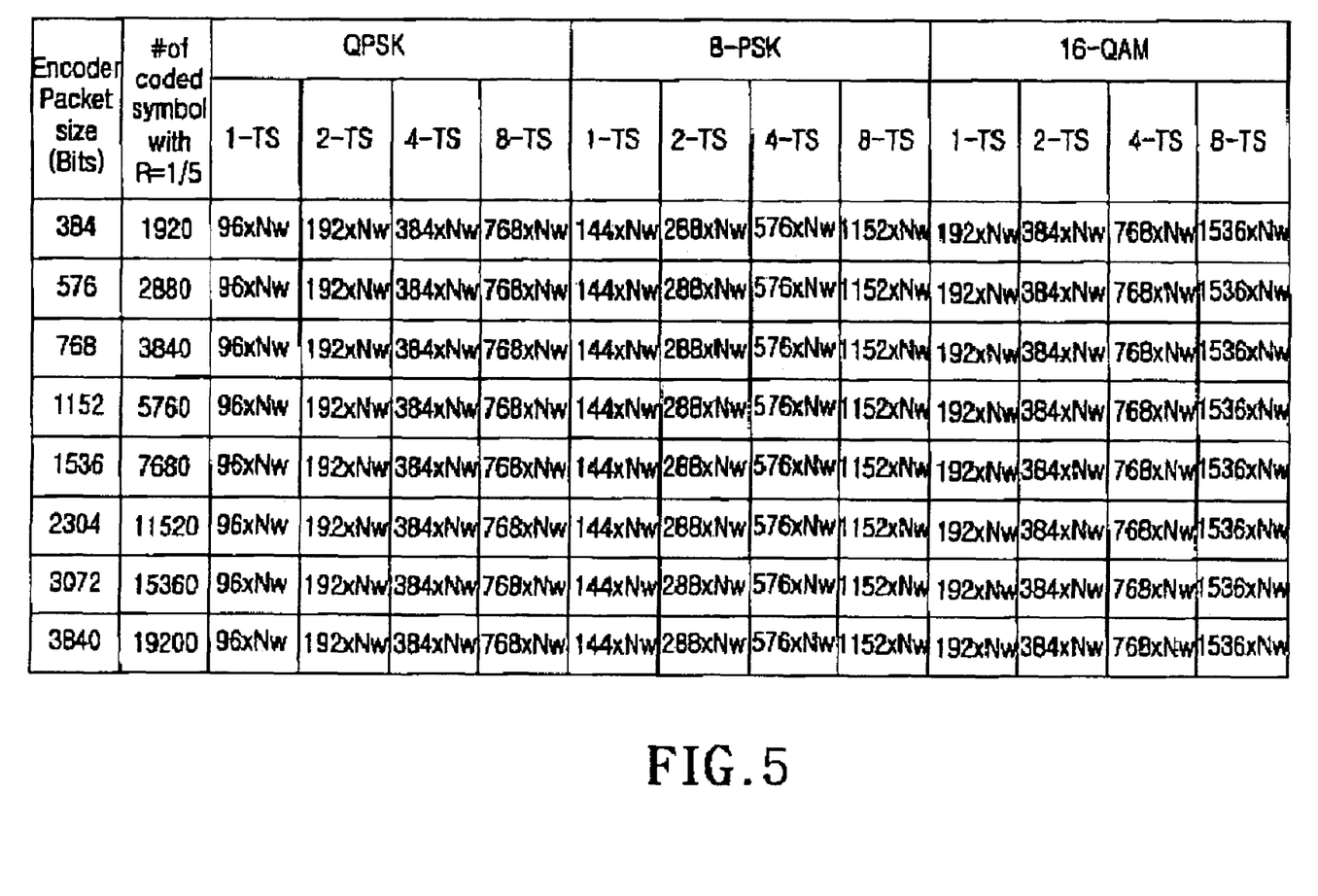
FIG. 5 illustrates the number of coded symbols transmitted according to a modulation order and a transmission time period for a packet data channel.

The number of coded symbols transmitted by a base station every transmission time period is determined according to a modulation order and a length of a transmission time period used by the base station. FIG. 5 illustrates the number of coded symbols transmitted according to a modulation order and a transmission time period in the case where a packet data channel uses a chip rate of 1.2288 Mcps (Mega chips per second) and each time slot has a 1.25 ms length. In FIG. 5, Nw, representing the number of Walsh codes, is a maximum of 28 in the 1xEV-DV system. For example, if the coded packets are modulated by QPSK modulation for 1 TS using 28 Walsh codes, then 2,688 (=96×28) coded symbols are actually transmitted. However, if 16-QAM modulation is used, then 5,376 (=192×28) coded symbols are transmitted.

For FIG. 5, a transmission procedure of the packet data channel transmitter will be described inversely. In order to support the standard chip rate of 1.2288 Mcps, a Walsh spreader in the packet data channel transmitter must generate 1,536 chips for a 1.25 ms time period (1 TS). Since a packet data channel uses a 32-chip length Walsh code, the number of modulation symbols to be generated by a modulator in the packet data channel transmitter for 1.25 ms (1 TS) is 48 (=1,536 chips/32 chips). Here, the number of coded symbols mapped to each modulation symbol is 2 for QPSK modulation, 3 for 8-PSK modulation, and 4 for 16-QAM modulation. Therefore, the number of coded symbols needed to generate 48 modulation symbols becomes 96 (=48×2) for QPSK modulation, 144 (=48×3) for 8-PSK modulation, and 192 (48×4) for 16-QAM modulation.

As the number of time slots and Walsh codes increases, the number of coded symbols being transmitted also increases. Therefore, the packet data channel transmitter repeats and/or punctures coded symbols output from an encoder, in order to match the number of coded symbols output from the encoder to the number of coded symbols being transmitted.

FIG. 5 illustrates the number of coded symbols actually transmitted according to only the modulation order, the number of time slots and the number of Walsh codes, and in this case, a base station and a mobile station do not store the illustrated mapping table. That is, the mobile station calculates the number of coded symbols being actually transmitted/received, based on the modulation order, the number of time slots and the number of Walsh codes, acquired from the control information.

Figure 6:
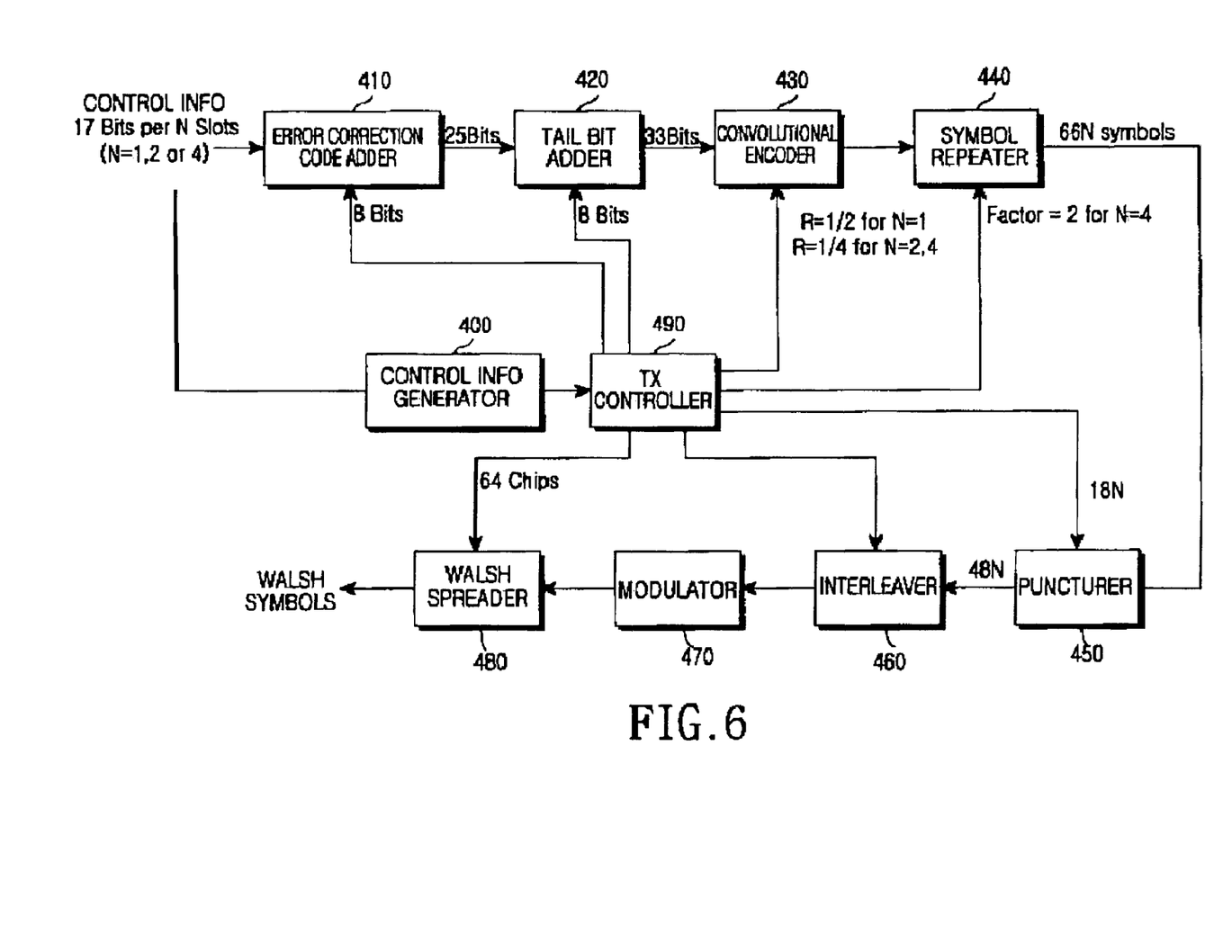
FIG. 6 illustrates a structure of a transmitter for transmitting control information in a base station according to an embodiment of the present invention.

FIG. 6 illustrates a structure of a packet data control channel transmitter for transmitting control information in a base station according to an embodiment of the present invention. As illustrated, the packet data control channel transmitter includes an error correction code adder 410, a tail bit adder 420, a convolutional encoder 430, a symbol repeater 440, a symbol puncturer 450, an interleaver 460, a modulator 470, a Walsh spreader 480, a control information generator 400, and a transmission controller 490.

Here, the error correction code adder 410, the tail bit adder 420, the convolutional encoder 430, the symbol repeater 440, the symbol puncturer 450, the interleaver 460, the modulator 470, and the Walsh spreader 480 constitute a control information transmitter for actually transmitting control information generated by the control information generator 400, and the transmission controller 490 controls transmission blocks of the control information transmitter.

Though not illustrated, a packet data channel transmitter of the base station selects a mobile station to which it will transmit packet data, based on forward radio channel quality information acquired from all mobile stations in packet data service, and determines an encoder packet size, a code rate, a modulation order, and a transmission time period (or the number of time slots) to be used for transmission of packet data to the selected mobile station. It is assumed that information on the number of Walsh codes to be used for transmission of the packet data is previously broadcast to all mobile stations.

Meanwhile, the control information generator 400 generates control information used for transmission of packet data to the selected mobile station. The control information, as described in conjunction with Table 2, is 17-bit frame information comprised of MAC ID field, ARQ Channel ID field, Encoder Packet Size field, Subpacket ID field, and Modulation Order field. The transmission controller 490 determines parameters to be used in the transmission blocks for each of the cases where the packet data service is applied to TDM, TDM/TDM and TDM/CDM. Herein, the embodiment of the present invention will be described with reference to a case where the packet data service is applied to TDM.

An 8-bit error correction code is added by the error correction code adder 410 to the 17-bit control information generated by the control information generator 400, and then, 8 tail bits are added to the error correction code-added control information by the tail bit adder 420, for convergence into a specified state during decoding. The convolutional encoder 430 encodes 33 output bits from the tail bit adder 420 at a code rate R determined based on a transmission time period of the control information, and outputs coded symbols. For example, if the control information is transmitted over 1 TS (N=1), the code rate becomes R=½. If the control information is transmitted over 2 TSs (N=2) or 4 TSs (N=4), the code rate becomes R=¼.

The coded symbols output from the convolutional encoder 430 are properly repeated by the symbol repeater 440 according to the transmission time period of the control information. That is, if the control information is transmitted over 1 TS or 2 TSs (N=1 or 2), the input coded symbols are not repeated, and if the control information is transmitted over 4 TSs (N=4), the input coded symbols are repeated once. The symbol puncturer 450 punctures some of the repeated coded symbols according to a predetermined puncturing pattern, and outputs the remaining non-punctured symbols.

The interleaver 460 sets a size of its interleaving memory according to the number of symbols received from the symbol puncturer 450, and interleaves the received symbols using the interleaving memory. The modulator 470 modulates the interleaved symbols according to a predetermined modulation order (e.g., QPSK) and outputs modulation (or modulated) symbols. The Walsh spreader 480 spreads the modulation symbols output from the modulator 470 with a 64-chip length Walsh code assigned to the packet data control channel. The Walsh code assigned to the packet data control channel is distinguishable from Walsh codes assigned to packet data channels. The output of the Walsh spreader 480, together with an output of the packet data channel transmitter, are converted into an RF (Radio Frequency) band signal through spreading by a PN (Pseudo-random Noise) code and baseband filtering, and then transmitted through an antenna.

The output of the packet data channel transmitter is equal to a signal obtained by encoding as much packet data as the determined encoder packet size at the determined code rate, modulating the coded packet data by the determined modulation technique, and spreading the modulated packet data with as many Walsh codes as the determined number of Walsh codes.

Figure 7:
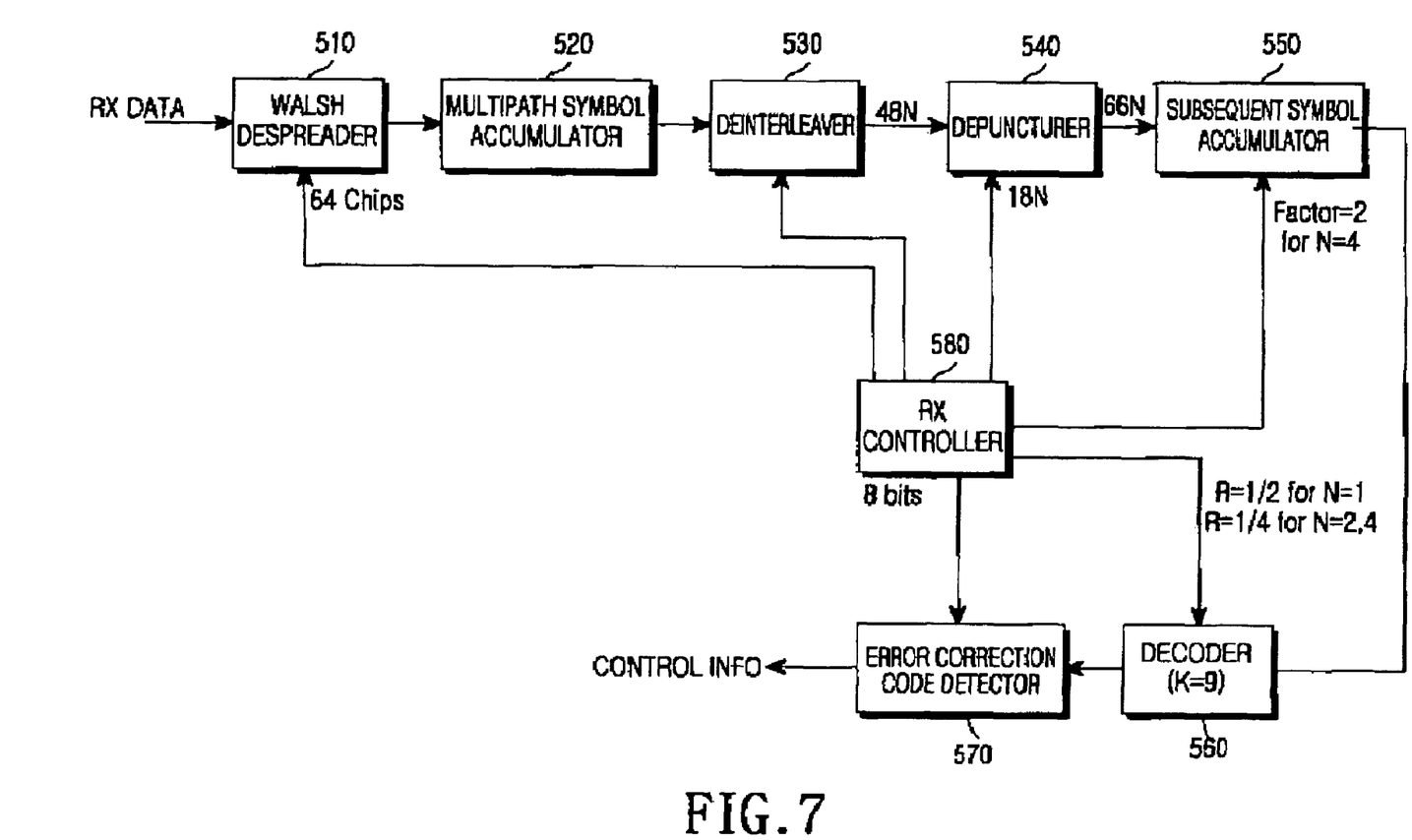
FIG. 7 illustrates a structure of a receiver for receiving control information in a mobile station according to an embodiment of the present invention.

FIG. 7 illustrates a structure of a packet data control channel receiver for receiving control information in a mobile station according to an embodiment of the present invention. As illustrated, the packet data control channel receiver includes a Walsh despreader 510, a multipath symbol accumulator 520, a deinterleaver 530, a depuncturer 540, a subsequent symbol accumulator 550, a decoder 560, an error correction code detector 570, and a reception controller 580.

Reception of the control information is performed in reverse process to transmitting the control information. The reception controller 580 determines parameters to be applied to reception blocks for each of the cases where the packet data service is applied to TDM, TDM/TDM and TDM/CDM. Herein, the embodiment of the present invention will be described with reference to a case where the packet data service is applied to TDM.

Referring to FIG. 7, the Walsh despreader 510 despreads data received from a base station with a Walsh code assigned to the packet data control channel. Though not illustrated, the Walsh despreader 510 performs Walsh despreading on each of multiple reception paths. The multipath symbol accumulator 520 accumulates as many symbols, despread by the Walsh despreader 510, as the number of multiple reception paths.

The accumulated symbols are deinterleaved by the deinterleaver 530 according to a deinterleaving rule corresponding to the interleaving rule used in the base station. The depuncturer 540 inserts a predetermined number of '0' symbols between the deinterleaved symbols according to a depuncturing pattern corresponding to the puncturing pattern used in the base station. The symbols output from the depuncturer 540 undergo accumulation through the subsequent symbol accumulator 550. The accumulation corresponds to the symbol repetition performed in the base station. That is, the subsequent symbol accumulator 550 accumulates input symbols once, only when a transmission time period of the control information is 4 TSs (N=4).

The symbols accumulated by the subsequent symbol accumulator 550 are decoded by the decoder 560 at a predetermined code rate R. The code rate becomes R=½ for N=1, and R=¼ for N=2 or 4. The error correction code detector 570 checks whether the decoded information bits have an error. If the decoded information bits have no error, the error correction code detector 570 judges that the decoded information bits are control information transmitted by the base station.

Though not illustrated, the mobile station checks whether MAC ID extracted from the control information is identical to its own MAC ID, and enables the packet data channel receiver, if the extracted MAC ID is identical to its own MAC ID. The packet data channel receiver extracts information on transmission time period (or the number of time slots), modulation order, code rate and encoder packet size from the control information, and performs Walsh despreading, demodulation and decoding on data received over a packet data channel based on the extracted information. Here, information on the number of Walsh codes needed to despread the received data is previously broadcast from the base station.

Referring to above, the number of coded symbols transmitted by a base station every transmission time period is determined according to a modulation order and a length of a transmission time period used by the base station. The number of coded symbols determinates the code rate and the repetition number and the puncture pattern of the coded symbols. In the present invention, the base station transmits a modulation of a packet data channel over a packet data control channel. A mobile station decodes the information received the packet data control channel and acquires the number of coded symbols transmitted over the packet data channel. Then, the mobile station can decode the packet data channel using the number of coded symbols. The transmission time period of the packet data channel is equal to the transmission time period of the packet data control channel. The mobile station can acquire the transmission time period of the packet data control channel using a blind rate detection.

As described above, the base station and the mobile station according to the present invention do not require memories for storing mapping tables for mapping modulation orders and code rates according to the encoder packet size and the number of Walsh codes for a packet data channel. Therefore, the present invention is advantageous in reducing size, power consumption and cost of the mobile station. In addition, the present invention enables the base station to select a modulation order regardless of a combination of the encoder packet size, the number of Walsh codes and the transmission time period, so the base station has no limitation in determining a modulation order and a code rate for initial transmission and retransmission according to a radio channel environment.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting control information for a packet data channel in a transmitter for a mobile communication system during a transmission period equal to a transmission period of a packet data, which encodes an encoder packet at a predetermined code rate, modulates the coded packet according to a predetermined modulation order, spreads the modulated packet with at least one Walsh code and transmits the spread packet over the packet data channel, the method comprising:
   generating control information indicating parameters used for transmission of the spread packet over the packet data channel;
   inserting at least one bit exclusively indicating a modulation order used for transmission of the spread packet among a plurality of available modulation orders into one information field in the control information; and
   transmitting the control information over a packet data control channel physically distinguishable from the packet data channel.

2. The method of claim 1, wherein the modulation orders include at least two of QPSK (Quadrature Phase Shift Keying), 8-PSK (8-ary Phase Shift Keying), 16-QAM (16-ary Quadrature Amplitude Modulation) and 64-QAM (64-ary Quadrature Amplitude Modulation).

3. The method of claim 1, wherein the control information includes information about an encoder packet size, a code rate and the number of Walsh codes used for the packet data channel.

4. A method for receiving control information over a packet data channel during a time period by a receiver in a mobile communication system which encodes an encoder packet at a predetermined code rate, modulates the coded packet according to a predetermined modulation order, spreads the modulated packet with at least one Walsh code and transmits the spread packet to the receiver over the packet data channel, the method comprising:

receiving and decoding a control information over a packet data control channel physically distinguishable from the packet data channel, the control information indicating parameters used for transmission of the spread packet over the packet data channel,; and     extracting from an information field in the decoded control information, at least one bit exclusively indicating a modulation order used for transmission of the spread packet among a plurality of available modulation orders.

5. The method of claim 4, wherein the modulation orders include at least two of QPSK (Quadrature Phase Shift Keying), 8-PSK (8-ary Phase Shift Keying), 16-QAM (16-ary Quadrature Amplitude Modulation) and 64-QAM (64-ary Quadrature Amplitude Modulation).

6. An apparatus for transmitting control information for a packet data channel in a transmitter for a mobile communication system during a transmission period equal to a transmission period of a packet data, which encodes an encoder packet at a predetermined code rate, modulates the coded packet according to a predetermined modulation order, spreads the modulated packet with at least one Walsh code and transmits the spread packet over the packet data channel, the apparatus comprising:

a control information generator for generating control information indicating parameters used for transmission of the spread packet over the packet data channel, and inserting at least one bit exclusively indicating a modulation order used for transmission of the spread packet among a plurality of available modulation orders into one information field in the control information; and     a control information transmitter for transmitting the control information over a packet data control channel physically distinguishable from the packet data channel.

7. The apparatus of claim 6, wherein the modulation orders include at least two of QPSK (Quadrature Phase Shift Keying), 8-PSK (8-ary Phase Shift Keying), 16-QAM (16-ary Quadrature Amplitude Modulation) and 64-QAM (64-ary Quadrature Amplitude Modulation).

8. The apparatus of claim 6, wherein the control information includes information about an encoder packet size, a code rate and the number of Walsh codes used for the packet data channel.

9. An apparatus for receiving control information over a packet data channel during a time period by a receiver in a mobile communication system which encodes an encoder packet at a predetermined code rate, modulates the coded packet according to a predetermined modulation order, spreads the modulated packet with at least one Walsh code and transmits the spread packet to the receiver over the packet data channel, the apparatus comprising:

a control information receiver for receiving and decoding a control information over a packet data control channel physically distinguishable from the packet data channel, the control information indicating parameters used for transmission of the spread packet,; and     an extractor for extracting from an information field in the decoded control information, at least one bit exclusively indicating a modulation order used for transmission of the spread packet data among a plurality of available modulation orders.

10. The apparatus of claim 9, wherein the modulation orders include at least two of QPSK (Quadrature Phase Shift Keying), 8-PSK (8-ary Phase Shift Keying), 16-QAM (16-ary Quadrature Amplitude Modulation) and 64-QAM (64-ary Quadrature Amplitude Modulation).

11. A method for receiving control information for a packet data channel by a receiver over a packet data control channel in a mobile communication system, wherein a transmission time period of the packet data channel is equal to a transmission time period of the packet data control channel, the method comprising:

acquiring a length of the transmission time period of the packet data control channel;

extracting from an information field in the decoded control information, at least one bit exclusively indicating a modulation order, the number of the walsh codes and the size of a encoder packet from a control information received over the packet data control channel during the acquired transmission time period;

determining the number of coded symbols received the packet data channel according to the acquired transmission time period and the modulation order; and     decoding the packet data channel using to the number of coded symbols.

12. The method of claim 11, wherein the number of coded symbols determines a code rate, the repetition number and a puncture pattern of the coded symbols received over the packet data channel.

* * * * *